US007538502B2

(12) United States Patent
Hongo

(10) Patent No.: US 7,538,502 B2
(45) Date of Patent: May 26, 2009

(54) MOTOR DRIVER CIRCUIT, CONTROL METHOD THEREOF, AND ELECTRONIC APPARATUS

(75) Inventor: Masayuki Hongo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/204,270

(22) Filed: Sep. 4, 2008

(65) Prior Publication Data

US 2009/0009108 A1 Jan. 8, 2009

Related U.S. Application Data

(63) Continuation of application No. 11/141,017, filed on Jun. 1, 2005, now Pat. No. 7,429,836.

(30) Foreign Application Priority Data

Jun. 3, 2004 (JP) ............................ 2004-166141

(51) Int. Cl.
*H02P 7/08* (2006.01)

(52) U.S. Cl. ......................... 318/66; 318/800; 318/782; 318/400.21; 318/700

(58) Field of Classification Search .................. 318/66, 318/800, 782, 400.21
See application file for complete search history.

(56) References Cited

U.S. PATENT DOCUMENTS

| | | | | |
|---|---|---|---|---|
| 4,290,000 | A * | 9/1981 | Sun | 318/566 |
| 5,418,708 | A * | 5/1995 | Nairus | 363/65 |
| 5,559,416 | A * | 9/1996 | Hrassky | 318/678 |
| 6,384,561 | B1 * | 5/2002 | Niizuma et al. | 318/625 |
| 6,388,904 | B2 * | 5/2002 | Nomura | 363/71 |
| 6,456,508 | B1 | 9/2002 | Namai et al. | 363/17 |
| 6,914,790 | B2 * | 7/2005 | Matsubara et al. | 363/34 |
| 7,102,320 | B1 * | 9/2006 | Haman | 318/400.29 |
| 7,248,490 | B2 * | 7/2007 | Olsen et al. | 363/71 |
| 7,271,554 | B2 * | 9/2007 | Aizawa | 318/34 |
| 2005/0024000 | A1 * | 2/2005 | Aizawa | 318/34 |

FOREIGN PATENT DOCUMENTS

| | | |
|---|---|---|
| JP | 9-37347 | 2/1997 |
| JP | 11-332001 | 11/1999 |
| JP | 2005-65486 | 3/2005 |

* cited by examiner

*Primary Examiner*—T C Patel
*Assistant Examiner*—Renata McCloud
(74) *Attorney, Agent, or Firm*—Fitzpatrick, Cella, Harper & Scinto

(57) ABSTRACT

A motor driver circuit comprising a diving circuit for driving at least one motor, a plurality of DC/DC converters, and a stopping circuit for stopping the DC/DC converter if failure is detected in an output of the DC/DC converter, wherein a first signal is outputted when a specific DC/DC converter of the plurality of DC/DC converters is stopped by the stopping circuit, and a specific DC/DC converter is recovered when a second signal is inputted. A CPU of an apparatus incorporated with the motor driver circuit is informed that the specific DC/DC converter has been stopped by the stopping circuit. Moreover, the stopped DC/DC converter can be recovered without need for turning off a power supply of the motor driver circuit itself.

11 Claims, 4 Drawing Sheets

MOTOR DRIVER CIRCUIT, CONTROL METHOD THEREOF, AND ELECTRONIC APPARATUS

FIELD OF THE INVENTION

The present invention relates to a motor driver circuit and a control method thereof and, in particular, to control of a motor driver circuit including: a driving circuit for driving at least one motor; a plurality of DC/DC converter; and a protective circuit for stopping the DC/DC converter if failure is detected in an output of the DC/DC converter and an electronic apparatus.

BACKGROUND OF THE INVENTION

Recently, an inkjet recording apparatus which includes a plurality of motors has been popular to meet various types of operations such as scanning of a printhead, feeding of recording paper, conveyance of recording paper under a recording state, and maintenance of a printhead.

A motor driver used in an electronic apparatus like such an inkjet recording apparatus, which is structured as one IC by including a multi-axis driving circuit capable of driving a plurality of motors, has been increasing in number.

The DC/DC converter circuit has been conventionally included an overcurrent detection means, overvoltage detection means and an internal temperature detection means as a detection means for detecting failure and malfunction. The overcurrent detection means detects that the current running through a MOS transistor of a DC/DC converter has exceeded a prescribed value (refer to Japanese Patent Laid-Open No. 9-037347).

The reason an overcurrent occurs is roughly divided into two cases: one is occurrence of failure such as short-circuit; the other is load current of the DC/DC converter in an overloaded state.

The overvoltage detection means detects that an output voltage of the DC/DC converter has changed by approx. 30% up and down.

The overcurrent detection means of the DC/DC converter is configured so that the overcurrent generated when a power supply (VBUS) is applied to an apparatus connected through a USB interface may be detected.

As mentioned above, the motor driver includes the multi-axis driving circuit capable of driving a plurality of motors and is configured as one IC. To configure one IC (integrated circuit), a regulator, DC/DC converter, reset circuit or the like may be further assembled.

When the above-mentioned overcurrent detection means (or overvoltage detection means) is detected, the output stage of the DC/DC converter is OFF-controlled by taking it as failure occurring in an IC (integrated circuit) including the overcurrent detection means, and the motor driving circuit is controlled so as to stop.

In the case that the reset function is included, a reset signal for setting the IC of which power supply is fed from the DC/DC converter of the motor driver to a reset condition is asserted.

With the above-mentioned configuration, overcurrent protection by overcurrent detection of the DC/DC converter, overvoltage protection by overvoltage detection, and overheat protection of IC by an IC internal temperature detection means operate and, if any DC/DC converter or motor driving circuit falls into a stopping condition, the DC/DC converter or the motor driving circuit is not recovered any more until a power supply inputted in the motor driver is turned off once, and a power switch is turned on again after power voltage drops below a prescribed voltage level.

Where the DC/DC converter built in the motor driver supplies power to CPU, power supply to the CPU is turned off once the power supply of the motor driver is turned off.

That is, if any of the protection circuits operates, the power supply of the CPU is turned off, so that the CPU cannot recognize which of the protection circuits operates.

SUMMARY OF THE INVENTION

It is an object of the present invention to provide a motor driver circuit including a plurality of DC/DC converters, capable of annunciating a specific DC/DC converter is stopped by a stopping circuit and recovering the converter.

To achieve the above-mentioned object, a motor driver circuit according to one aspect of the present invention comprises a diving circuit for driving at least one motor, a plurality of DC/DC converters, a stopping circuit for stopping the DC/DC converter if failure is detected in an output of the DC/DC converter, a signal output circuit for outputting a first signal if a specific DC/DC converter of the plurality of DC/DC converters is stopped by the stopping circuit, and recovery means for recovering the specific DC/DC converter when a second signal is inputted.

That is, in a motor driver circuit according to the present invention, including the driving circuit for driving at least one motor, the plurality of DC/DC converters, and the stopping circuit (protection circuit) for stopping the DC/DC converters if failure is detected in the output of the DC/DC converter, a first signal is outputted when a specific one of the plurality of DC/DC converters is stopped by the stopping circuit, and the specific DC/DC converter is recovered when a second signal is inputted.

With this configuration, the outside is informed by the first signal that the specific DC/DC converter of the plurality of DC/DC converters is stopped by the stopping circuit and, by inputting the second signal from the outside, the specific DC/DC converter can be recovered.

The CPU of an apparatus incorporated with the motor driver circuit is informed that the specific DC/DC converter is stopped by the stopping circuit and, by outputting the second signal from the CPU, the stopped DC/DC converter can be recovered without need for turning off the power supply of the motor driver circuit itself.

The motor driver circuit may further include communication means of performing communication with the outside and is configured so as to individually set whether or not, if respective DC/DC converters are stopped by the stopping circuit, any other DC/DC converter should be stopped in accordance with a setting from the outside through the communication means.

In this case, the motor driver circuit may further include a reset circuit of outputting a reset signal to the outside and is configured so as to individually set whether or not, if respective DC/DC converters are stopped by the stopping circuit, the reset signal should be outputted in accordance with a setting from the outside through the communication means.

The stopping circuit may detect failure in accordance with at least a threshold of either of an output current and an output voltage of respective DC/DC converters.

A DC/DC converter other than the specific DC/DC converter may supply electric power to control means for controlling an apparatus incorporated with the motor driver circuit and the communication means communicates with the control means.

The specific DC/DC converter may supply electric power to an apparatus connected with an apparatus incorporated with the motor driver circuit through USB.

The communication means may make a serial communication.

To achieve the above-mentioned object, an electronic apparatus according to another aspect of the present invention operates a motor by communicating with the outside through interface means, and includes a control means of controlling the electronic apparatus, and a driving circuit for driving the motor by making a communication with the control means, wherein the driving circuit comprises a plurality of voltage generating means of generating voltage to perform power supply for the control means and the interface means respectively, a stopping circuit for stopping operations of the voltage generating means if any failure is detected in an output of the voltage generating means, a signal output circuit for outputting a first signal to the control means when a specific one of the plurality of voltage generating means is stopped by the stopping circuit, and means of permitting the operations of the specific voltage generating means when a second signal is inputted from the control means.

To achieve the above-mentioned object, a method of controlling motor driver circuit according to another aspect of the present invention comprises a diving circuit for driving at least one motor, a plurality of DC/DC converters, and a stopping circuit for stopping the DC/DC converter if failure is detected in an output of the DC/DC converter, wherein the method includes a signal output step of outputting a first signal when a specific DC/DC converter of the plurality of DC/DC converters is stopped by the stopping circuit, and a recovery step of recovering the specific DC/DC converter when a second signal is inputted.

The above-mentioned object can be achieved by a computer program for executing the control method for the motor driver circuit with a computer apparatus and a recording medium for storing the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the embodiment described hereinafter, a motor driver of a printing apparatus which utilizing a printhead according to the inkjet system is to be explained as an example.

<Description of Inkjet Printing Apparatus (FIG. 2)>

Figure 2:
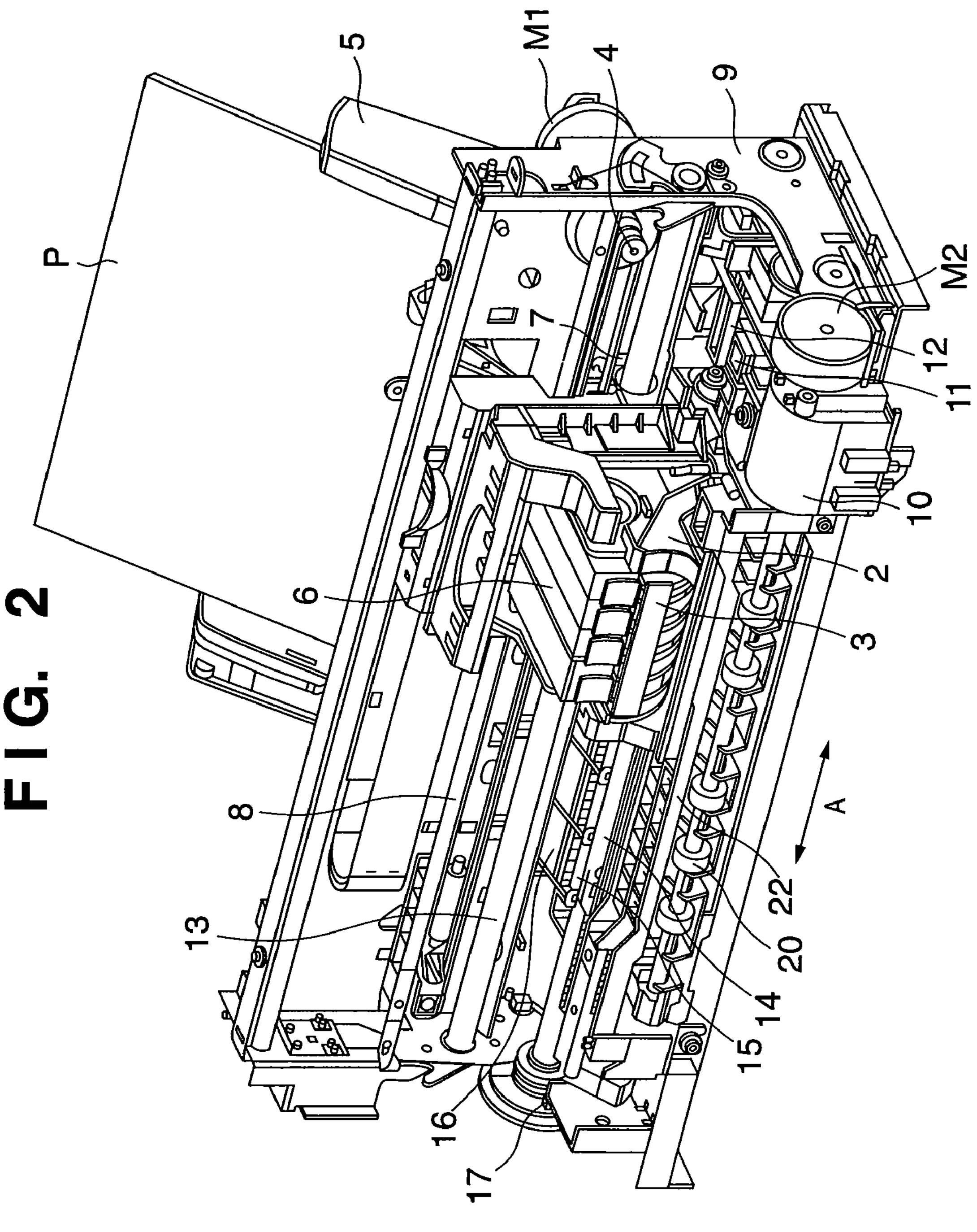
FIG. 2 is an outer perspective view showing the schematic structure of an inkjet recording apparatus as an electronic apparatus using the motor driver illustrated in FIG. 1.

FIG. 2 is an outer perspective view showing the schematic structure of an inkjet printing apparatus which prints with the printhead according to the present invention.

As shown in FIG. 2, in the inkjet printing apparatus (to be referred to as a printing apparatus hereinafter), a transmission mechanism 4 transmits a driving force generated by a carriage motor M1 to a carriage 2 which supports a printhead 3 for discharging ink to print by the inkjet method. The carriage 2 reciprocates in a direction indicated by an arrow A. A printing medium P such as a printing sheet is fed via a sheet feed mechanism 5, and conveyed to a printing position. At the printing position, the printhead 3 discharges ink to the printing medium P to print.

In order to maintain a good state of the printhead 3, the carriage 2 is moved to the position of a recovery device 10, and a discharge recovery process for the printhead 3 is executed intermittently.

The carriage 2 of the printing apparatus supports not only the printhead 3, but also an ink cartridge 6 which stores ink to be supplied to the printhead 3. The ink cartridge 6 is detachably mounted on the carriage 2.

The printing apparatus shown in FIG. 2 can print in color. For this purpose, the carriage 2 supports four ink cartridges which respectively store magenta (M), cyan (C), yellow (Y), and black (K) inks. The four ink cartridges are independently detachable.

The carriage 2 and printhead 3 can achieve and maintain a predetermined electrical connection by properly bringing their contact surfaces into contact with each other. The printhead 3 selectively discharges ink from a plurality of orifices and prints by applying energy in accordance with the printing signal. In particular, the printhead 3 according to the embodiment adopts an inkjet method of discharging ink by using thermal energy, and comprises an electrothermal transducer in order to generate thermal energy. Electric energy applied to the electrothermal transducer is converted into thermal energy. Ink is discharged from orifices by utilizing a pressure change caused by the growth and contraction of bubbles by film boiling generated by applying the thermal energy to ink. The electrothermal transducer is arranged in correspondence with each orifice, and ink is discharged from a corresponding orifice by applying a pulse voltage to a corresponding electrothermal transducer in accordance with the printing signal.

As shown in FIG. 2, the carriage 2 is coupled to part of a driving belt 7 of the transmission mechanism 4 which transmits the driving force of the carriage motor M1. The carriage 2 is slidably guided and supported along a guide shaft 13 in the direction indicated by the arrow A. The carriage 2 reciprocates along the guide shaft 13 by normal rotation and reverse rotation of the carriage motor M1. A scale 8 which represents the absolute position of the carriage 2 is arranged along the moving direction (direction indicated by the arrow A) of the carriage 2. In the embodiment, the scale 8 is prepared by printing black bars on a transparent PET film at a necessary pitch. One end of the scale 8 is fixed to a chassis 9, and its other end is supported by a leaf spring (not shown).

The printing apparatus has a platen (not shown) facing the orifice surface of the printhead 3, which has orifices (not shown). Simultaneously when the carriage 2 supporting the printhead 3 reciprocates by the driving force of the carriage motor M1, a printing signal is supplied to the printhead 3 to discharge ink and print on the entire width of the printing medium P conveyed onto the platen.

In FIG. 2, reference numeral 14 denotes a convey roller which is driven by a convey motor M2 in order to convey the printing medium P; 15, a pinch roller which makes the printing medium P abut against the convey roller 14 by a spring (not shown); 16, a pinch roller holder which rotatably supports the pinch roller 15; and 17, a convey roller gear which is fixed to one end of the convey roller 14. The convey roller 14 is driven by rotation of the convey motor M2 that is transmitted to the convey roller gear 17 via an intermediate gear (not shown).

Reference numeral 20 denotes a discharge roller which discharges the printing medium P bearing an image formed by the printhead 3 outside the printing apparatus. The discharge roller 20 is driven by transmitting rotation of the convey motor M2. The discharge roller 20 abuts against a spur roller (not shown) which presses the printing medium P by a spring (not shown). Reference numeral 22 denotes a spur holder which rotatably supports the spur roller.

As shown in FIG. 2, in the printing apparatus, the recovery device 10 which recovers the printhead 3 from a discharge failure is arranged at a desired position (e.g., a position corresponding to the home position) outside the reciprocation range (printing area) for printing operation of the carriage 2 supporting the printhead 3.

The recovery device 10 comprises a capping mechanism 11 which caps the orifice surface of the printhead 3, and a wiping mechanism 12 which cleans the orifice surface of the printhead 3. The recovery device 10 performs a discharge recovery process in which a suction means (suction pump or the like) within the recovery device forcibly discharges ink from orifices in synchronism with capping of the orifice surface by the capping mechanism 11, thereby removing ink with a high viscosity or bubbles in the ink channel of the printhead 3.

In non-printing operation or the like, the orifice surface of the printhead 3 is capped by the capping mechanism 11 to protect the printhead 3 and prevent evaporation and drying of ink. The wiping mechanism 12 is arranged near the capping mechanism 11, and wipes ink droplets attached to the orifice surface of the printhead 3.

The capping mechanism 11 and wiping mechanism 12 can maintain a normal ink discharge state of the printhead 3.

<Control Configuration of Inkjet Printing Apparatus (FIG. 3)>

Figure 3:
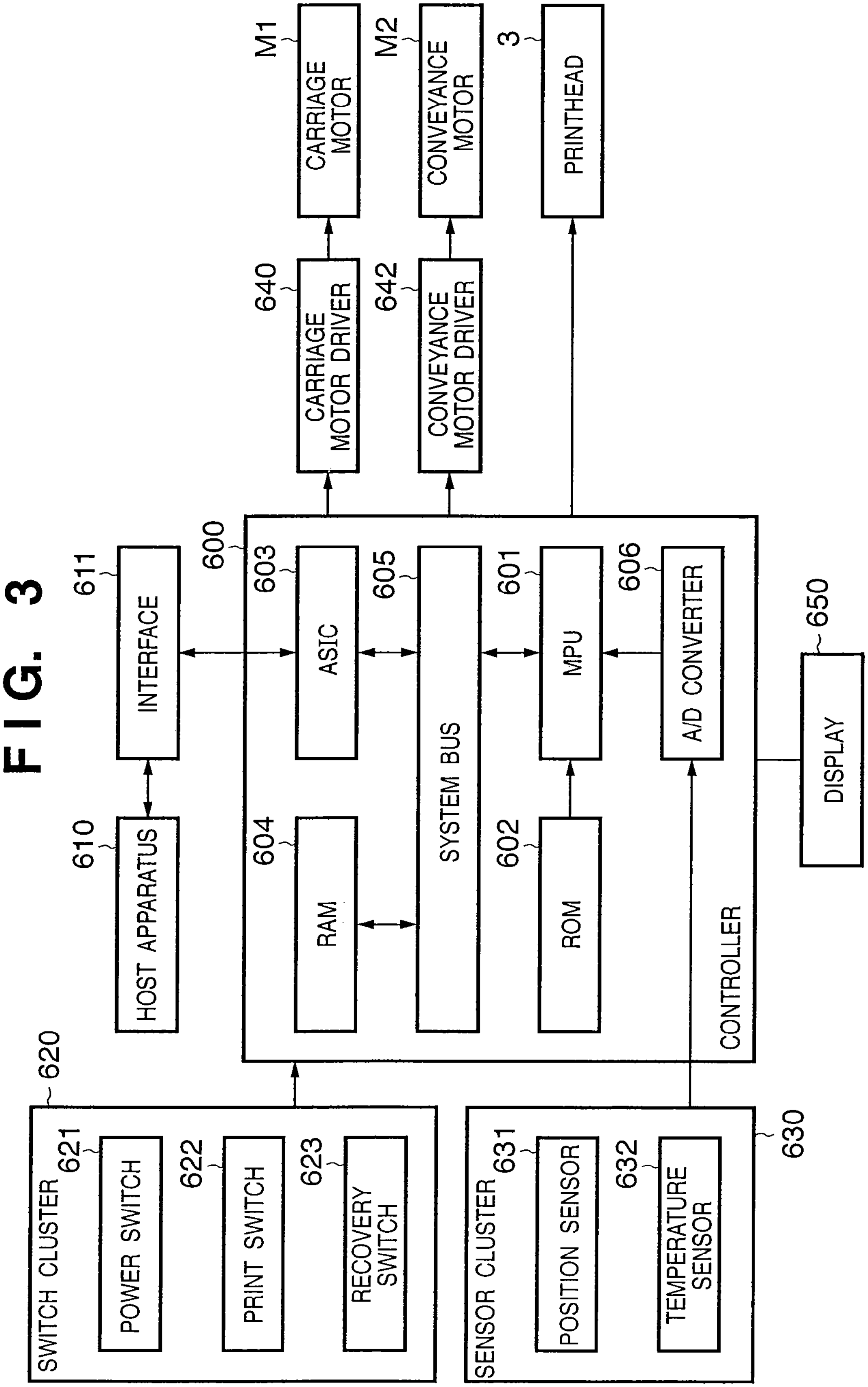
FIG. 3 is a block diagram showing a configuration of a control circuit of a recording apparatus illustrated in FIG. 2.

FIG. 3 is a block diagram showing the control configuration of the printing apparatus shown in FIG. 2.

As shown in FIG. 3, a controller 600 comprises an MPU 601, a ROM 602 which stores a program corresponding to a control sequence (to be described later), a predetermined table, and other permanent data, an ASIC (Application Specific IC) 603 which generates control signals for controlling the carriage motor M1, the convey motor M2, and the printhead 3, a RAM 604 having a printing data mapping area, a work area for executing a program, and the like, a system bus 605 which connects the MPU 601, ROM 602, ASIC 603, and RAM 604 to each other and exchanges data, and an A/D converter 606 which A/D-converts analog signals from a sensor group (to be described below) and supplies digital signals to the MPU 601.

In FIG. 3, reference numeral 610 denotes a host apparatus such as a computer (or an image reader, digital camera, or the like) serving as a printing data supply source. The host apparatus 910 and printing apparatus transmit/receive printing data, commands, status signals, and the like via an interface (I/F) 611.

Reference numeral 620 denotes a switch group which is formed from switches for receiving instruction inputs from the operator, such as a power switch 621, a print switch 622 for designating the start of print, and a recovery switch 623 for designating the activation of a process (recovery process) of maintaining good ink discharge performance of the printhead 3. Reference numeral 630 denotes a sensor group which detects the state of the apparatus and includes a position sensor 931 such as a photocoupler for detecting a home position h and a temperature sensor 632 arranged at a proper portion of the printing apparatus in order to detect the ambient temperature.

Reference numeral 640 denotes a carriage motor driver which drives the carriage motor M1 for reciprocating the carriage 2 in the direction indicated by the arrow A; and 642, a convey motor driver which drives the convey motor M2 for conveying the printing medium P.

In printing and scanning by the printhead 3, the ASIC 603 transfers driving data (DATA) for a printing element (discharge heater) to the printhead while directly accessing the storage area of the ROM 602.

<Motor Driver>

Figure 1:
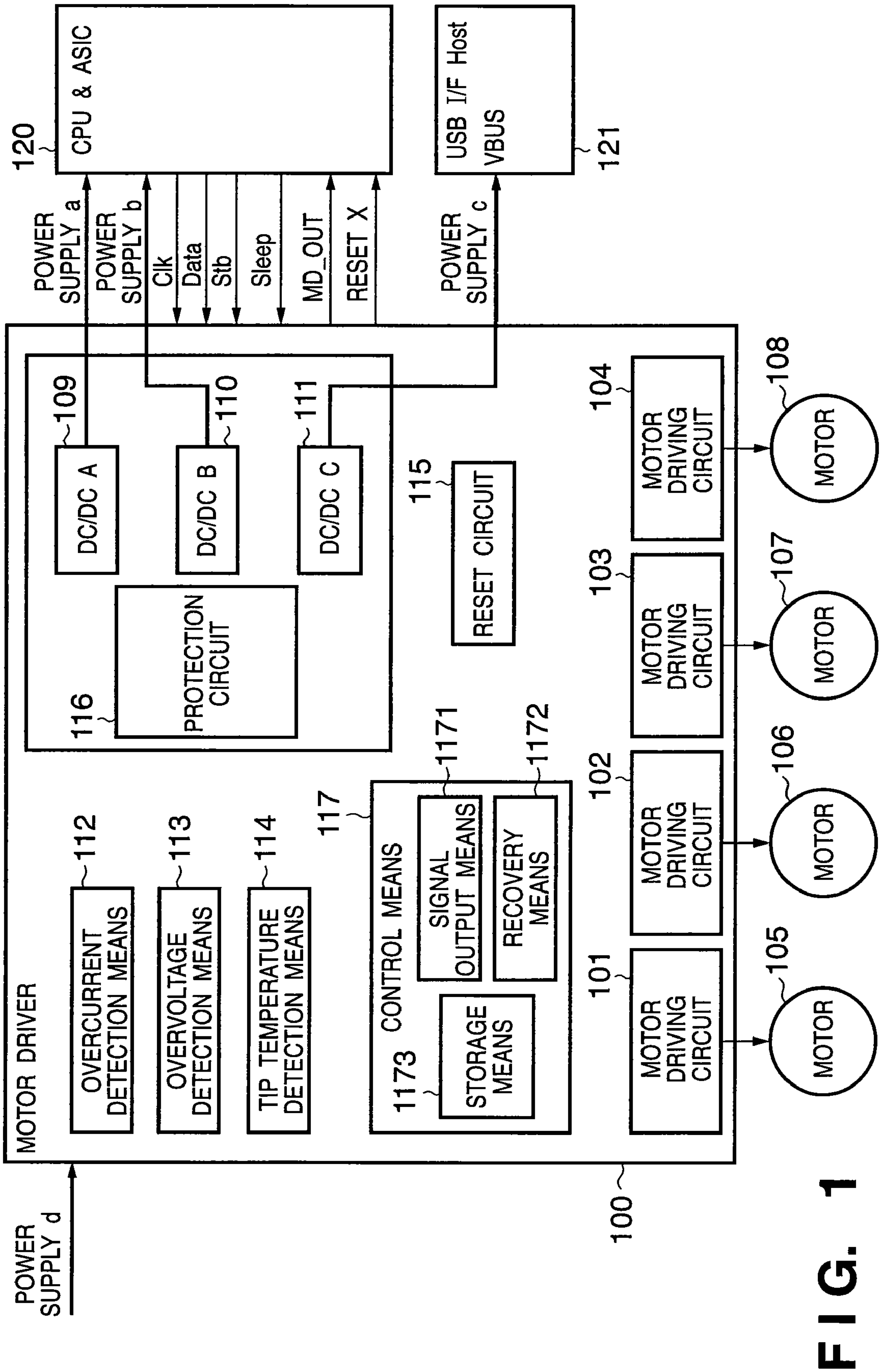
FIG. 1 is a block diagram showing a configuration of the motor driver according to the present invention.

FIG. 1 is a block diagram showing a configuration according to the embodiment of the motor driver circuit according to the present invention, which is used for the electronic apparatus (the printing apparatus) described above. The motor driver circuit according to the embodiment is integrally formed as one IC.

Reference number 100 is the motor driver circuit according to the embodiment in the figure. Reference numbers 101 to 104 are the driving circuits for driving the motors. Reference numbers 105 to 108 are motors driven by the motor driving circuits 101 to 104. As the motors, DC motors or stepping motors may be used. For example, a carriage motor driver 640 and a conveyance motor diver 642 as illustrated in FIG. 3 correspond to any of reference numbers 101 to 104.

Reference numbers 109 to 111 are DC/DC converters (voltage generating means). The motor driver circuit 100 of this embodiment includes 3-channel DC/DC converters of A, B and C. When an electric power d of 18V (volt) outputted from a power circuit not illustrated is inputted, each of the three DC/DC converters converts it into a desired voltage and conducts power supply (as indicated by arrows a, b and c).

Outputs of the DC/DC converters A (109) and B (110) are supplied to a CPU, an ASIC or a system IC being a 1-chip IC formed by integrating them or a LSI (120: hereinafter referred to as "CPU") as a power supply. In this embodiment, 3.3V for an external port and 1.5V for an internal logic are supplied respectively from the converters A and B. The DC/DC converter C (111) is connected to a power supply part (VBUS) of a USB interface (121) and is configured so as to supply an electric power of 5V to the connected USB apparatus.

A reference number 112 is an overcurrent detection means and detects that a current in excess of a prescribed level has run through a MOS transistor of a DC/DC converter. The overcurrent detection has two purposes: one is to detect occurrence of failure such as a short-circuit; the other is to detect that a load of a DC/DC converter output destination is very large (overload status). A reference number 113 is an overvoltage detection means and detects that an output voltage of DC/DC converter has changed by approx. 30%. A reference number 114 is a tip temperature detection means for detecting the temperature of an internal IC. A reference number 115 is a reset circuit and, after completion of starting the DC/DC converter, asserts a reset signal (RESETX) during approx. 100 ms to reset an external circuit (CPU and ASIC 120). Thus, the printing apparatus is stopped.

The motor driver circuit 100 of this embodiment is controlled through serial communication from a CPU 120. The CPU 120 executes serial communication with three control signals of Clk, Data and Stb as illustrated in FIG. 1.

The CPU 120 can determines that an operation mode of the motor driver circuit 100 should be a low power consumption mode or an ordinary mode according to a state (High/Low) of a signal line Sleep illustrated. If a recording apparatus comes into no action and shifts to a standby status, the motor driver circuit 100 as well shifts from the ordinary mode to the low power consumption mode. A signal line MD_OUT is a signal line for monitor-outputting an internal signal of the motor driver circuit 100. For example, a setting is made so as to low-assert a MD_OUT signal if an overcurrent protection of an A-channel (109) of the DC/DC converter operates, so that the MD_OUT signal informs a control circuit such as the CPU 120 of it. Selection of an internal signal to be outputted to a MD_OUT terminal is made by serial communication through the three signal lines of Clk (clock signal), Data (data signal), and Stb (strobe signal). For example, by the signal line of Data, serial data of 16 bits are transmitted with the Clk signal and the Stb signal.

As described in the above-mentioned BACKGROUND OF THE INVENTION, the power supply of the CPU is turned off once the power supply of the motor driver circuit 100 is turned off while the DC/DC converter built in the motor driver circuit 100 is supplying electric power to the CPU. That is, there occurs a problem that the CPU cannot detect that any protection circuit has operated.

To solve such a problem, this embodiment comprises a protection circuit (stopping circuit) 116 for stopping the DC/DC converter during overcurrent detection, overvoltage detection and internal temperature rising; and a control means 117 including a signal output means 1171 for informing the CPU that the DC/DC converter has been stopped and a recovery means 1172 for recovering the DC/DC converter being stopped in accordance with a signal from the CPU. The stopping of the DC/Dc converter is made by, for example, stopping the switching operation of the MOS transistor. On the other hand, the recovery of the DC/DC converter (restarting the supply of electric power) is made by starting the switching operation of the MOS transistor.

The control means 117 further includes a storage means 1173. The storage means 1173 stores preset information transmitted from CPU 120 by serial communication through the three signal lines of Clk, Data and Stb as described above. The preset information stored in the storage means 1173 includes which DC/DC converter of A to C informs the CPU 120 by the signal MD_OUT when it is stopped by the protection circuit 116 and whether or not the other DC/DC converters should be stopped when any of the DC/DC converters are stopped by the protection circuit. That is, according to the information transmitted from the CPU 120, the DC/DC converter outputting the signal MD_OUT at the time of stopping is selected. When the DC/DC converter is stopped by the protection circuit, the DC/DC converters to be stopped of the other DC/DC converters are set individually according to the information transmitted from the CPU 120.

In this embodiment, when the DC/DC converter C (111) is stopped by the protection circuit, the signal line MD_OUT is low-asserted by a signal output means 1171 to inform the CPU 120 of it. When the DC/DC converter A or B (109 or 110) is stopped by the protection circuit, it is preset by serial communication from the CPU 120 that the other DC/DC converters are stopped by a reset circuit 115.

For example, when the DC/DC converter A is stopped by the protection circuit, the DC/DC converter B and the DC/DC converter C are set so as to be stopped.

In this embodiment, the DC/DC converter A and the DC/DC converter B are outputted to the CPU 120. If either of the DC/DC converters is stopped, the CPU 120 comes into no proper action, so that the other DC/DC converters are stopped.

This embodiment describes three DC/DC converters, but is not limited to them.

Figure 4:
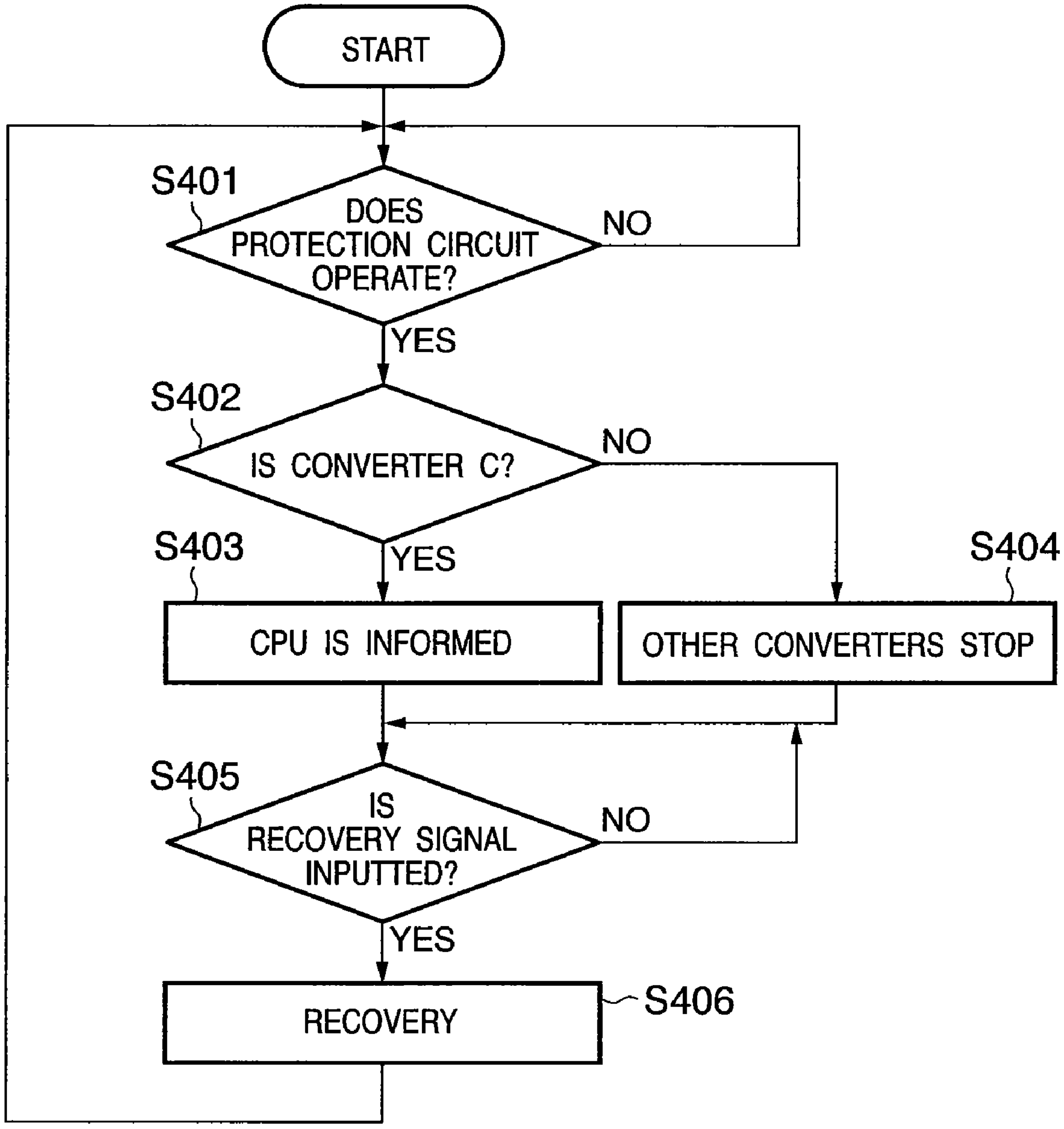
FIG. 4 is a control flowchart of a motor driver illustrated in FIG. 1.

Referring to a flowchart illustrated in FIG. 4, control of the DC/DC converter in the motor driver circuit 100 according to this embodiment is described below.

After the start-up, it is determined whether or not the protection circuit 116 operates at predetermined intervals (step S401). When it is detected that the protection circuit operates, it is determined whether or not DC/DC converter stopped by the protection circuit 116 is the DC/DC converter C (111) (step S402). If the stopped DC/DC converter is the DC/DC converter C (111), the signal MD_OUT is low-asserted by the signal output means 1171 to inform the CPU 120 of occurrence of failure such as overcurrent of VBUS of the USB interface (step S403). A display section 650 can display that some failure occurs in the DC/DC converter C (111). This display enables a user to remove a factor of overcurrent and to output Sleep from CPU 120, for example, by operating a switch not illustrated.

On the other hand, when it is determined that the stopped DC/DC converter is not the DC/DC converter C (111), the DC/DC converter A or B is stopped, therefore the other DC/DC converters are stopped by the reset circuit 115 (step S404) and a reset signal (RESETX) is outputted to a peripheral circuit (CPU 120).

After processing of step S403 or S404, a standby state is kept until the recovery signal (permit signal) is inputted from the CPU 120 (step S405). There are various processes as a method of recovering the stopped DC/DC converter. In this embodiment, a signal of Sleep is used concurrently, and a setting is made so be recovered with a rising edge of Sleep.

The Sleep signal is an input pin of IC for forming a motor driver circuit. If the input level is naturally low, it is assigned so that the operation mode of the motor driver is set to a low power consumption mode. In this embodiment, when at least one DC/DC converter is stopped by the protection circuit 116, the stopped DC/DC converter is recovered if the recovery means 1172 recognizes the rising edge of Sleep signal.

As described above, this embodiment can inform the CPU that the DC/DC converter C for supplying electric power to an external USB apparatus, of the plurality of built-in DC/DC converters, has been stopped by the protection circuit. Recovery of the DC/DC converter can be executed in accordance with a signal from CPU, therefore in the motor driver circuit including the plurality of DC/DC converters, the CPU can recognize that a specific DC/DC converter has been stopped by the protection circuit to recover the converter.

Other Embodiment

In a configuration including the protection circuit (stopping circuit) for stopping driving of a motor by making each of the motor driving circuits 101 to 104 detect a state of the motor, the motor driving circuits may be so configured as to stop the driving of the motor, when the protection circuit is actuated, for example, due to some failure of the motor, and to transmit it from a motor driver 100 to the CPU 120 with any other signal than the signal MD_OUT.

This configuration may take a configuration using the Sleep signal even when recovery processing of the motor driving circuit is conducted after its possible cause is removed. That is, recovery processing of the motor driving circuit and recovering processing of voltage may have such a configuration as to share the Sleep signal.

Moreover, this configuration can restrain an increase in the number of signal lines for communication between the CPU 120 and the motor driver 100.

The presetting information to be stored in a storage means 1173 may be a threshold value for making an overcurrent detection means determine overcurrent or making an overvoltage detection means determine overvoltage, in addition to the above contents.

A factor for outputting a Sleep signal from the CPU 120 is not limited to a switching operation by a user.

The above-mentioned invention provides a serial type inkjet recording apparatus applied as one embodiment of the invention, but is not limited to such an application. Where a circuit configuration includes a motor driver and a plurality of DC/DC converters, the invention is not limited to the recording apparatus but can be applied to motor driver circuits for various types of apparatuses.

The motor driver circuit is described as an example where it is controlled by serial communication from a control circuit (control means) such as a CPU. If there are no restrictions on the number of signal lines or layout, data may be transferred by a plurality of signal lines (parallel transfer).

The above embodiment is described using the case where a plurality of DC/DC converters are built in a motor driver circuit. It will be obvious to those skilled in the art that the invention can be applied to the case where the motor driver includes a plurality of power circuits for regulators other than the DC/DC converters.

The present invention can be applied to a system comprising a plurality of devices (e.g., host computer, interface, reader, printer) or to an apparatus comprising a single device (e.g., copying machine, facsimile machine).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

If the present invention is realized as a storage medium, program codes corresponding to the above mentioned flowchart (FIG. 4) is to be stored in the storage medium.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-166141, filed Jun. 3, 2004, which is hereby incorporated by reference.

The invention claimed is:

1. A power supply circuit comprising:

a plurality of DC/DC converters for respectively generating different voltages;

a detection circuit for detecting an output failure in each of the plurality of DC/DC converters;

a stopping circuit for stopping a DC/DC converter in which the output failure was detected by the detection circuit;

a signal output circuit for outputting a first signal if a specific DC/DC converter of the plurality of DC/DC converters is stopped by the stopping circuit;

recovery means for recovering the specific DC/DC converter when a second signal is inputted after outputting the first signal; and a reset circuit for, if the stopping circuit stops at least one of the plurality of DC/DC converters other than the specific DC/DC converter, stopping the rest of the plurality of DC/DC converters.

2. The power supply circuit according to claim 1, further comprising communication means for performing communication with the outside, with the communication means configured so as to individually set whether or not, if respective DC/DC converters are stopped by the stopping circuit, any other DC/DC converter should be stopped in accordance with a setting from the outside through the communication means.

3. The power supply circuit according to claim 1, wherein the reset circuit outputs a reset signal to the outside and is configured so as to individually set whether or not, if respective DC/DC converters are stopped by the stopping circuit, the reset signal should be outputted in accordance with a setting from the outside through the communication means.

4. The power supply circuit according to claim 1, wherein the detection circuit detects failure in accordance with at least a threshold of either of an output current and an output voltage of respective DC/DC converters.

5. The power supply circuit according to claim 1, wherein the specific DC/DC converter supplies electric power to a first apparatus connected, through a USB interface, with a second apparatus containing the power supply circuit.

6. The power supply circuit according to claim 1, wherein the power supply circuit is an integrated circuit.

7. The power supply circuit according to claim 6, further comprising temperature detection means for detecting a temperature of the integrated circuit, wherein the detection circuit detects failure based on the temperature detected by the temperature detection means.

8. An electronic apparatus comprising:

a control means for controlling the electronic apparatus; and a power supply circuit;

with the power supply circuit comprising:

a plurality of DC/DC converters for respectively generating different voltages;

a detection circuit for detecting an output failure in each of the plurality of DC/DC converters;

a stopping circuit for stopping a DC/DC converter in which the output failure was detected by the detection circuit;

a signal output circuit for outputting a first signal to the control means if a specific DC/DC converter of the plurality of DC/DC converters is stopped by the stopping circuit;

permit means for starting the specific DC/DC converter when a second signal is inputted from the control means after outputting the first signal; and a reset circuit for, if the stopping circuit stops at least one of the plurality of DC/DC converters other than the specific DC/DC converter, stopping the rest of the plurality of DC/DC converters.

9. The electronic apparatus according to claim 8, further comprising:

a display, wherein the control means displays occurrence of failure of specific voltage generating means to the display, based on the first signal.

10. The electronic apparatus according to claim 8, wherein the power supply circuit is an integrated circuit.

11. The electronic apparatus according to claim 8, further comprising interface means for communicating with a device, wherein the specific DC/DC converter supplies electric power to the device.

* * * * *